(12) United States Patent
Werner et al.

(10) Patent No.: US 11,777,183 B2
(45) Date of Patent: Oct. 3, 2023

(54) BATTERY HOUSING FOR A MOTOR VEHICLE BATTERY

(71) Applicant: Dr. Ing. h.c. F. Porsche Aktiengesellschaft, Stuttgart (DE)

(72) Inventors: Michael Werner, Besigheim (DE); Alexander Klausmann, Schönaich (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 9 days.

(21) Appl. No.: 17/370,104

(22) Filed: Jul. 8, 2021

(65) Prior Publication Data
US 2022/0045409 A1    Feb. 10, 2022

(30) Foreign Application Priority Data
Aug. 5, 2020 (DE) .................... 10 2020 120 627.5

(51) Int. Cl.
*H01M 50/60*    (2021.01)
*H01M 10/48*    (2006.01)
*H01M 10/613*   (2014.01)
*H01M 10/6567*  (2014.01)
*H01M 50/24*    (2021.01)

(52) U.S. Cl.
CPC ........... *H01M 50/60* (2021.01); *H01M 10/48* (2013.01); *H01M 10/613* (2015.04); *H01M 10/6567* (2015.04); *H01M 50/24* (2021.01)

(58) Field of Classification Search
None
See application file for complete search history.

(56) References Cited

U.S. PATENT DOCUMENTS

| | | | |
|---|---|---|---|
| 2011/0177371 A1* | 7/2011 | Belton | B60L 50/66 429/98 |
| 2013/0111939 A1 | 5/2013 | Yan | |
| 2014/0020763 A1 | 1/2014 | Phlegm et al. | |
| 2017/0256764 A1* | 9/2017 | Li | H01M 50/30 |
| 2018/0366792 A1* | 12/2018 | Stachewicz | B60Q 1/52 |
| 2019/0020075 A1* | 1/2019 | Ito | H01M 10/486 |

(Continued)

FOREIGN PATENT DOCUMENTS

| | | |
|---|---|---|
| CN | 110265600 | * 9/2019 |
| DE | 102009054922 A1 | 6/2011 |

(Continued)

*Primary Examiner* — Lisa S Park
(74) *Attorney, Agent, or Firm* — RatnerPrestia

(57) ABSTRACT

A battery housing for a motor vehicle battery includes a housing for accommodating at least one battery cell in an interior space delimited by the housing; a drainage device communicates with the interior space; a detection device detects an air moisture content and/or a liquid fill level in the interior space; and an evaluation unit which is connected to the detection device. The evaluation unit is connected to the drainage device and the drainage device is designed to open and/or close in a manner dependent on the liquid fill level ascertained in the evaluation unit. By way of the linking of the drainage device to the detection device by way of the evaluation unit, it can be ensured that the drainage device is opened only in particularly expedient situations, such that good protection of a motor vehicle battery against moisture is made possible.

17 Claims, 1 Drawing Sheet

(56) References Cited

U.S. PATENT DOCUMENTS

2020/0335833 A1\* 10/2020 Schmidt .............. H01M 50/249
2021/0159473 A1\* 5/2021 Han .................... H01M 50/394

FOREIGN PATENT DOCUMENTS

| DE | 102013212859 A1 | 1/2014 |
| DE | 102013201411 A1 | 7/2014 |
| DE | 102013212593 A1 | 12/2014 |
| DE | 102014200789 A1 | 7/2015 |
| DE | 102014008847 A1 | 12/2015 |
| DE | 102017217155 A1 | 3/2019 |

\* cited by examiner

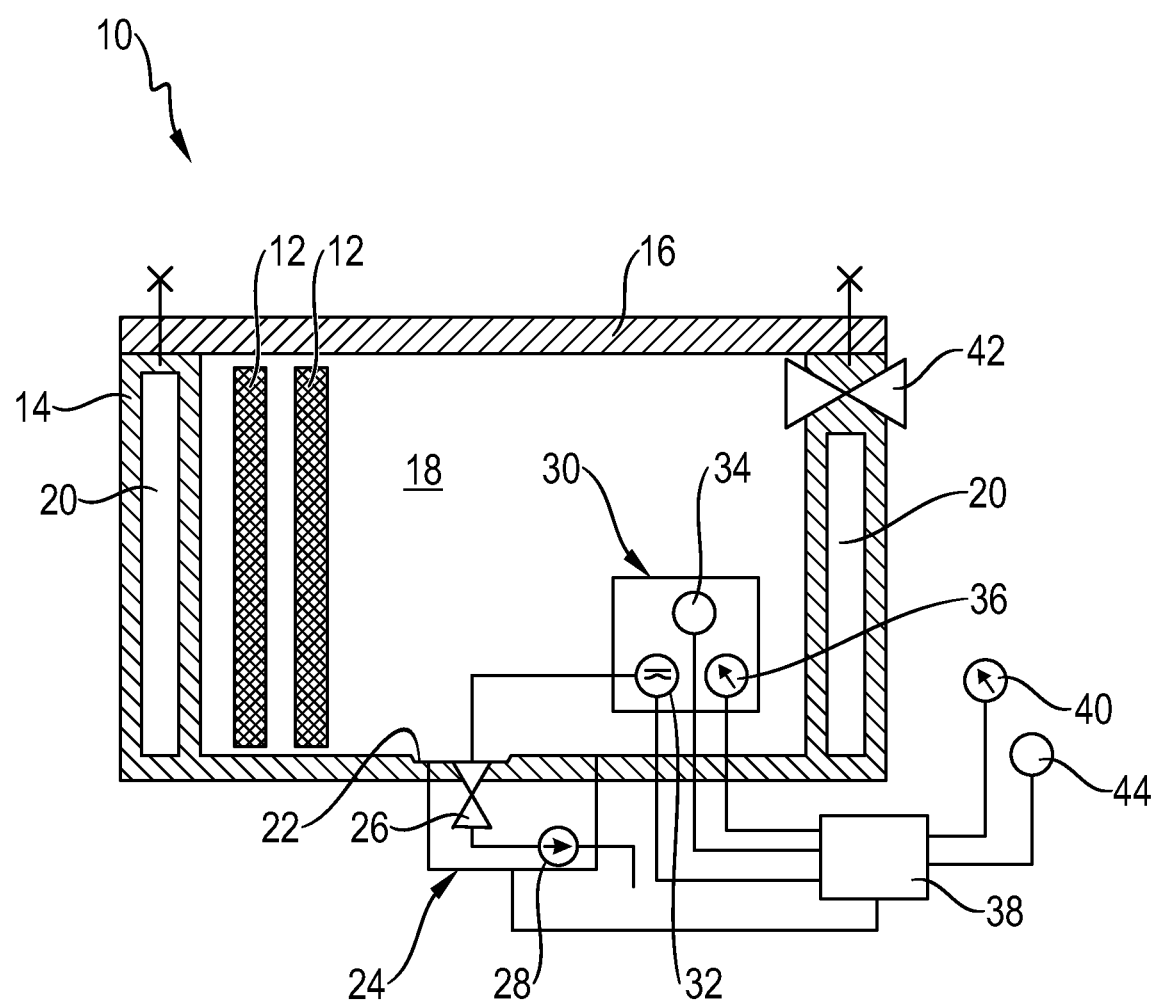

BATTERY HOUSING FOR A MOTOR VEHICLE BATTERY

CROSS-REFERENCE TO RELATED APPLICATION

This application claims priority to German Patent Application No. 10 2020 120 627.5, filed Aug. 5, 2020, the content of such application being incorporated by reference herein in its entirety.

FIELD OF THE INVENTION

The invention relates to a battery housing for a motor vehicle battery, with the aid of which battery cells of the motor vehicle battery can be protected against moisture.

BACKGROUND OF THE INVENTION

DE 10 2017 217 155 A1, which is incorporated herein by reference, has disclosed a battery housing for a motor vehicle battery, wherein the battery housing has a valve for discharging condensation water and has a moisture sensor for the function monitoring of the battery housing.

DE 10 2014 008 847 A1, which is incorporated herein by reference, has disclosed a battery housing for a motor vehicle battery, wherein the battery housing has a valve which opens as required for the purposes of discharging condensation water.

There is a constant requirement for protecting a motor vehicle battery against moisture.

SUMMARY OF THE INVENTION

It would be desirable to specify measures which allow good protection of a motor vehicle battery against moisture.

One embodiment relates to battery housing for a motor vehicle battery, having a housing for accommodating at least one battery cell in an interior space delimited by the housing, a drainage device which communicates with the interior space and which serves for discharging liquid and/or moisture out of the interior space of the housing, a detection device for detecting an air moisture content and/or a liquid fill level in the interior space of the housing, and an evaluation unit which is connected to the detection device and which serves for ascertaining a liquid fill level and/or moisture content that can be dissipated via the drainage device, wherein the evaluation unit is connected to the drainage device and the drainage device is designed to open and/or close in a manner dependent on the liquid fill level and/or moisture content ascertained in the evaluation unit.

By means of the detection device, measured values can be ascertained, from which, in the evaluation unit, a liquid fill level and/or a rising liquid fill level in the interior space of the housing can be ascertained. The detection device may for example have a fill level sensor, with the aid of which the fill level of a liquid, in particular collected condensation water, can be directly measured. In the evaluation unit, it can then be checked whether the fill level is high enough to be able to flow out via the drainage device, in particular via a drainage valve, which is actuatable by the evaluation unit, of the drainage device. For example, the drainage device which is electrically actuatable by the evaluation unit is designed to electrically open the drainage valve in reaction to an electrical signal transmitted by the evaluation unit, in order that the liquid that has collected in the interior space can, owing to its hydrostatic pressure, flow out via the drainage valve under the action of gravitational force. Here, it may be advantageous if the drainage device is opened by the evaluation unit only when a sufficiently high fill level is present, in order that the drainage device is not opened for longer than is absolutely necessary and an ingress of moist air from the surroundings via the drainage device into the interior space of the housing can be avoided. In particular if the drainage device is designed to discharge the liquid even in the presence of a very low fill level, it is possible that a fill level sensor alone is not accurate enough to be able to measure a sufficient fill level. In particular, the detection device may have a moisture sensor which can measure a moisture content of the air in the interior space of the housing. By means of the measurement of the moisture content in the air, it is possible in the evaluation unit for increasing wetting of a base of the interior space and/or a leak to be inferred, and for an opening of the drainage device to be triggered.

By means of the discharge of the liquid via the drainage device, it is possible to avoid a situation in which the liquid causes a short circuit and/or corrosion in the battery cells, provided in the interior space, of the motor vehicle battery. The provision of dryer cartridges that absorb the moisture and would have to be exchanged during servicing can be avoided, such that, in particular, the interior space of the housing can be configured to be free from moisture-absorbing drying agents. By means of the monitoring of the climatic conditions within the interior space of the housing by means of the detection device, it is possible, in the evaluation unit, for the presence of liquid and/or for the impending formation of liquid in the interior space to be qualitatively and/or quantitatively estimated. In this way, it is possible that the evaluation unit can assess the climatic situation in the interior space of the housing with such effectiveness that the evaluation unit opens the drainage valve only when a discharge of the liquid is ensured or can take place particularly quickly and, at the same time, a backflow of moist air via the drainage valve into the interior space of the housing, which can lead to condensation in the interior space of the housing, is minimized. By means of the linking of the drainage device to the detection device by way of the evaluation unit, it can be ensured that the drainage device is opened only in particularly expedient situations, such that good protection of a motor vehicle battery against moisture is made possible.

In particular, the evaluation unit is designed to trigger an opening of the drainage device if a predefined threshold value for the ascertained liquid fill level is overshot. It can thereby be ensured that the liquid to be discharged via the drainage device is under a particular hydrostatic pressure that promotes a fast discharge of the liquid. Here, it can be taken into consideration that the liquid can collect in a depression in the base, where the inducement of a short circuit in a battery cell is reliably avoided. In this way, it is possible to allow a certain fill level in the interior space of the housing without this leading to adverse effects at the battery cells. The drainage device can thus be actuated less frequently in order to discharge a particular liquid quantity, such that the extent of a backflow of moist air via the drainage valve into the interior space can be at least reduced.

The evaluation unit is preferably designed to store the chronological course of a detected moisture content in the interior space of the housing over a defined minimum time period and to trigger an opening of the drainage device if a predefined threshold value for the derivative with respect to time of the detected moisture content is overshot. An overshooting of the threshold value indicates a very fast increase of the moisture content in the interior space of the housing, which in turn can indicate a leak, for example of cooling liquid, into the interior space. By means of the evaluation of the chronological course of the measured values of the detection device in the evaluation unit, the function of leak detection can be implemented and, by means of an actuation of the drainage device by the evaluation unit, the detected leak can be reacted to in a sufficient manner by virtue of the fact that the liquid leakage flow can be discharged before impairment of the battery cells occurs.

It is particularly preferable for a pressure equalization valve which is integrated in the drainage device or which is formed separately from the drainage device to be provided for equalizing pressure in the interior space of the housing with the surroundings. In particular if the battery cells warm up during ongoing operation, the air in the interior space of the housing can also warm up and generate a positive pressure, which can be discharged via the pressure equalization valve. Since warmed air can be laden with more water vapor than cold air, it is thus possible in the present situation for evaporated liquid to be discharged from the interior space of the housing, such that, when the battery cells cool, correspondingly less condensation of the water vapor on the battery cells occurs. The interior space of the housing can thus be dried.

In particular, it is provided that an outside sensor which is connected to the evaluation unit and which serves for the detection of a moisture content outside the housing is provided, and the pressure equalization valve is designed to open if the moisture content detected by the outside sensor is lower than the moisture content detected by the detection device, wherein, in particular, the evaluation unit is connected to the outside sensor and the evaluation unit actuates the pressure equalization valve. In this way, it is possible for the climatic conditions not only within the housing but also outside the housing to be monitored, and in particular compared with one another. An opening of the pressure equalization valve and/or of the drainage device when a particularly high moisture content is present outside the housing, and the ingress of an unnecessarily large amount of water vapor into the interior space of the housing, which can condense there, by way of an air flow from outside the housing to the interior of the housing, can thus be avoided. An introduction of liquids into the interior space of the housing can thus be avoided or at least kept low.

Preferably, an interior pressure sensor for detecting a pressure in the interior space of the housing and an outside pressure sensor for detecting a pressure outside the housing are provided, wherein the pressure equalization valve is designed to open if the pressure detected by the outside pressure sensor is lower than the pressure by the interior pressure sensor, wherein, in particular, the evaluation unit is connected to the interior pressure sensor and to the outside pressure sensor and the evaluation unit actuates the pressure equalization valve. If the battery cells of the motor vehicle battery warm up during ongoing operation and the air in the interior space of the housing is heated up, a positive pressure that is generated can be discharged via the pressure equalization valve and/or via the drainage valve. Here, the evaporated liquid contained in the warmed air can also be discharged from the interior space of the housing. By means of a comparison of the pressure detected by the interior pressure sensor with the pressure detected by the outside pressure sensor, it can be ensured that a positive pressure actually prevails in the housing in relation to the ambient pressure, such that a flow of moist air from the surroundings into the interior space of the housing can be avoided. It is particularly preferable if a threshold value for a pressure difference of the pressures detected by the interior pressure sensor and the outside pressure sensor is provided in the evaluation unit, such that, during the pressure equalization, a significantly high flow speed can be achieved, in the case of which a backflow from the outside to the interior can be minimized.

The housing particularly preferably has a liquid-conducting cooling device for the temperature control of the at least one battery cell, wherein a liquid cooling medium used by the cooling device is detectable in the interior space by the detection device. The cooling device may be integrated in a base, in a ceiling and/or in a side wall of the housing, such that the material of the housing may, at one side, delimit the interior space and, at another side, delimit a cooling channel. If, in the event of damage the housing, in particular as a result of a crash, the cooling medium passes as a leakage flow into the interior space of the housing, the detection device can detect this liquid quantity, for example on the basis of an increasing liquid fill level and/or a suddenly increasing moisture content in the interior space of the housing, and prevent damage to the battery cells through timely actuation of the drainage device. In this way, an additional fail-safe functionality and/or a limp-home or emergency operation measure for the battery cells in the housing can be attained, whereby a simpler and less complicated design of the cooling device can be allowed.

In particular, the drainage device has a conveying element for the active suction of liquid and/or moisture out of the interior space counter to an ambient pressure. By means of the conveying element, which is designed in particular as a pump and/or blower, a significant conveying flow can be attained even in the presence of an ambient pressure which is high in relation to the pressure in the interior space of the housing. Furthermore, a backflow from the outside into the interior can be blocked by the conveying element. The conveying element may in particular be electrically actuated and/or may simultaneously form the drainage valve. For example, the conveying element can build up a negative pressure that opens a check valve which seals in the direction of the interior space of the housing.

The drainage device is preferably electrically actuatable by the evaluation unit. A passive, gravity-driven configuration of the drainage device is thus avoided, such that the actuation of the drainage device can be made dependent on a multiplicity of criteria that are taken into consideration in the evaluation unit. The evaluation unit can take into consideration numerous situations in which, in one case, an opening of the drainage device, but in another, similar case, a closing of the drainage device, would constitute the optimum solution. In particular, it is thus easily also possible to take into consideration the situation of a leak of a cooling medium into the interior space of the housing, wherein this situation can necessitate an operating behavior of the drainage device other than the discharge of condensation water of the moist air enclosed in the interior space of the housing.

The multiple electrically contacted battery cells are particularly preferably provided in the interior space, wherein the battery cells are enclosed in fluid-tight fashion in the housing. The multiple battery cells may be interconnected with one another by way of open electrical contacts. Since a timely discharge of liquids that arise in the interior space is ensured, no special fluid-tight electrical contacting of the battery cells is necessary. The risk of a short circuit as a result of an accumulation of condensation water is thus avoided, or at least kept low, even the case of open and non-insulated electrical contacts. The housing, which is for example closed by means of a cover, is in this case of fluid-tight design, such that no liquid and/or no moist air can ingress via the joints of the housing.

BRIEF DESCRIPTION OF THE DRAWING FIGURES

The invention is explained below by way of example with reference to the appended drawing and on the basis of a preferred exemplary embodiment, wherein the features presented below may in each case individually or in combination represent an aspect of the invention. In the drawing:

The sole FIGURE shows a schematic sectional view of a battery housing.

DETAILED DESCRIPTION OF THE INVENTION

The battery housing 10 illustrated in the FIGURE can be used for accommodating battery cells 12 of a motor vehicle battery of a motor vehicle in fluid-tight fashion. The battery housing 10 may have a housing 14 which has an interior space 18 closed for example by a cover 16, in which interior space the battery cells 12 are accommodated, said battery cells being designed for example as pouch cells, rod cells or individual cells manufactured with a special housing (prismatic cells). The housing 14 has, for example in side walls, a cooling device 20 which can be flowed through by a cooling medium in order to control the temperature of the battery cells 12 by cooling and/or heating to a desired temperature. Condensation water or other liquids that arise in the interior space, for example cooling medium that leaks into the interior space 18, can collect on the base of the housing, in particular in a depression 22. By means of a drainage device 24, the liquids that have collected in the depression 22 can be discharged to the surroundings. In the exemplary embodiment illustrated, the drainage device 24 has a drainage valve 26 and a conveying element 28 designed as a pump.

By means of a detection device 30, the climatic conditions in the interior space 18 of the housing 14 can be monitored. For this purpose, the detection device 30 may in particular have a fill level sensor 32 for detecting the liquid fill level in the housing 14 or in the depression 22 and/or a moisture sensor 34 for detecting the moisture content in the interior space 18 and/or an interior pressure sensor 36 for detecting the pressure in the interior space 18 and/or a temperature sensor for detecting the temperature in the interior space 18. The measured data ascertained by the detection device 30 may be processed in an evaluation unit 38 and stored in particular over a predefined period of time, in order that the chronological course of the measured values can also be evaluated. If the evaluation unit 38 identifies a situation in which a discharge of liquid out of the interior space 18 of the housing 14 appears possible and suitable, the evaluation unit 38 can electrically actuate the drainage device 24, in particular the drainage valve 26 and/or the conveying element 28, in order to entirely or partially discharge the liquid that is collected in the depression 22.

It is also possible for an outside pressure sensor 40 to be provided which can measure the ambient pressure such that, for the decision to actuate the drainage device 24, which decision is to be made in the evaluation unit 38, the ambient pressure detected by the outside pressure sensor 40 can be taken into consideration as an opposing pressure which prevails at the outlet of the drainage device 24. Furthermore, a separate pressure equalization valve 42 may be provided which communicates at one side with the interior space 18 and at the other side with the surroundings. The pressure equalization valve 42 can also be actuated by the evaluation unit 38, in particular taking into consideration a pressure difference between the pressures measured by the interior pressure sensor 36 and the outside pressure sensor 40, at a suitable point in time ascertained in the evaluation unit 38. In addition or alternatively, an outside sensor 44 may be provided which is connected to the evaluation unit 38 and with the aid of which the moisture content in the ambient air can be measured. The evaluation unit 38 can thus take the moisture content of the ambient air into consideration in the decision as to whether the drainage device 24 and/or the pressure equalization valve 42 is to be opened. An ingress of particularly moist ambient air into the interior space 18 of the housing 16, with the risk of a correspondingly large amount of condensation water, can thus be avoided.

What is claimed:

1. A battery housing for a motor vehicle battery, said battery housing comprising:
    a housing for accommodating at least one battery cell in an interior space delimited by the housing,
    a drainage device which communicates with the interior space and which serves for discharging liquid and/or moisture out of the interior space of the housing,
    a detection device for detecting an air moisture content and/or a liquid fill level in the interior space of the housing,
    an evaluation unit which is connected to the detection device and which serves for ascertaining a liquid fill level and/or moisture content that can be dissipated via the drainage device, wherein the evaluation unit is connected to the drainage device and the drainage device is configured to open and/or close in a manner dependent on the liquid fill level and/or moisture content ascertained by the evaluation unit, and
    a pressure equalization valve, which is integrated in the drainage device or which is formed separately from the drainage device, that is configured for equalizing pressure in the interior space of the housing with surroundings,
    wherein the pressure equalization valve is connected to (i) the evaluation unit, (ii) an interior pressure sensor for detecting a pressure in the interior space of the housing, and (iii) an outside pressure sensor for detecting a pressure outside the housing,
    wherein the evaluation unit is configured to open the pressure equalization valve when the pressure detected by the outside pressure sensor is lower than the pressure detected by the interior pressure sensor,
    wherein the evaluation unit is configured to store a chronological course of a detected moisture content in the interior space of the housing over a defined minimum time period and to trigger an opening of the drainage device if a predefined threshold value for a derivative with respect to time of the detected moisture content is overshot, and wherein the predefined threshold value for the derivative is indicative of a leakage of liquid into the housing.

2. The battery housing as claimed in claim 1, wherein the evaluation unit is configured to trigger an opening of the drainage device if a predefined threshold value for the ascertained liquid fill level is overshot.

3. The battery housing as claimed in claim 1, further comprising an outside moisture sensor connected to the evaluation unit and that serves for detecting a moisture content outside the housing, and wherein the pressure equalization valve is configured to open if the moisture content detected by the outside moisture sensor is lower than the moisture content detected by the detection device, wherein the evaluation unit is connected to the outside moisture sensor and the evaluation unit actuates the pressure equalization valve.

4. The battery housing as claimed in claim 1, wherein the housing has a liquid-conducting cooling device for temperature control of the at least one battery cell, wherein a liquid cooling medium used by the cooling device is detectable in the interior space by the detection device.

5. The battery housing as claimed in claim 1, wherein the drainage device has a conveying element for the active suction of liquid and/or moisture out of the interior space counter to an ambient pressure.

6. The battery housing as claimed in claim 1, wherein the drainage device is electrically actuatable by the evaluation unit.

7. The battery housing as claimed in claim 1, wherein multiple electrically contacted battery cells are provided in the interior space, wherein the battery cells are enclosed in fluid-tight fashion in the housing.

8. The battery housing as claimed in claim 1, wherein the pressure equalization valve is integrated in the drainage device.

9. The battery housing as claimed in claim 1, wherein the pressure equalization valve is formed separately from the drainage device.

10. The battery housing as claimed in claim 1, wherein the detection device comprises a moisture level sensor for detecting the air moisture content in the interior space of the housing.

11. The battery housing as claimed in claim 1, wherein the detection device comprises a liquid fill level sensor for detecting the liquid fill level in the interior space of the housing.

12. The battery housing as claimed in claim 1, wherein the detection device comprises (i) a moisture level sensor for detecting the air moisture content in the interior space of the housing, and (ii) a liquid fill level sensor for detecting the liquid fill level in the interior space of the housing.

13. The battery housing as claimed in claim 12, wherein the moisture level sensor and the liquid fill level sensor are integrated within the detection device that is positioned within the interior space of the housing.

14. The battery housing as claimed in claim 4, wherein the liquid-conducting cooling device and the pressure equalizing device are integrated in a wall of the housing.

15. The battery housing as claimed in claim 1, wherein the evaluation device is positioned outside of the housing.

16. The battery housing as claimed in claim 1, wherein the pressure equalization valve is in fluid communication with the interior space of the housing and the surroundings outside of the housing.

17. The battery housing as claimed in claim 1 further comprising a pump that is fluidly connected to the drainage device for discharging liquid out of the interior space of the housing.

\* \* \* \* \*